(12) United States Patent
Russell et al.

(10) Patent No.: US 7,540,523 B2
(45) Date of Patent: Jun. 2, 2009

(54) ANTI-JACKKNIFING HITCH ASSEMBLY

(75) Inventors: David Russell, Ann Arbor, MI (US); Chi Yip, Troy, MI (US); Dennis Kessler, Northville, MI (US); Paul Snyder, St. Clair, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 11/608,888

(22) Filed: Dec. 11, 2006

(65) Prior Publication Data

US 2008/0136139 A1    Jun. 12, 2008

(51) Int. Cl.
B60D 1/30    (2006.01)
(52) U.S. Cl. .................. 280/455.1; 280/430; 280/456.1
(58) Field of Classification Search .............. 280/455.1, 280/430, 456.1
See application file for complete search history.

(56) References Cited

U.S. PATENT DOCUMENTS

| | | | |
|---|---|---|---|
| 2,612,382 A | | 9/1952 | Landis |
| 3,250,524 A | * | 5/1966 | Boatright .................... 267/138 |
| 3,338,595 A | | 8/1967 | Bogie |
| 3,659,874 A | * | 5/1972 | Rendessy ................. 280/455.1 |
| 3,837,676 A | * | 9/1974 | Rendessy ................. 280/455.1 |
| 3,871,686 A | * | 3/1975 | Rendessy ................. 280/455.1 |
| 3,963,265 A | | 6/1976 | Kornoelje et al. |
| 3,964,767 A | * | 6/1976 | Williams ................. 280/455.1 |
| 3,989,269 A | | 11/1976 | Rendessy |
| 4,065,149 A | | 12/1977 | Roth |
| 4,204,700 A | | 5/1980 | Haines, Sr. |
| 4,278,267 A | | 7/1981 | Vasseur |
| 4,281,846 A | | 8/1981 | Hall |
| 4,306,734 A | | 12/1981 | Swanson et al. |
| 4,582,337 A | | 4/1986 | Hsueh |
| 4,585,248 A | | 4/1986 | Miller et al. |
| 4,714,264 A | * | 12/1987 | Woestelandt ............. 280/456.1 |
| 4,917,406 A | * | 4/1990 | Herchenbach et al. ... 280/455.1 |
| 4,991,863 A | | 2/1991 | Hosmer |
| 5,016,899 A | * | 5/1991 | Euteneier ................. 280/446.1 |
| 5,335,856 A | * | 8/1994 | Nathan ........................ 239/164 |
| 5,348,331 A | * | 9/1994 | Hawkins .................. 280/476.1 |
| 5,407,220 A | * | 4/1995 | Fischer .................... 280/455.1 |
| 5,984,341 A | * | 11/1999 | Kass et al. ............... 280/455.1 |
| 6,203,047 B1 | * | 3/2001 | Adamek et al. .......... 280/455.1 |
| 6,340,167 B1 | | 1/2002 | Boyd |

(Continued)

Primary Examiner—Paul N Dickson
Assistant Examiner—Marlon A Arce
(74) Attorney, Agent, or Firm—Dickinson Wright PLLC; Greg Brown

(57) ABSTRACT

An anti-jackknifing hitch assembly (12) ("assembly") includes a hitch (18), a tongue (20), two resilient members (22a, 22b), and a routing member (24). The hitch (18) is attached to a tow vehicle (10). The tongue (20) extends from a trailer (16) and is attached to the hitch (18). The tongue (20) pivots about a pivot axis (34) within a predetermined range of articulation (52) defined by the resilient members (22a, 22b). In particular, resilient members (22a, 22b) respectively connect end portions (36a, 36b) of hitch (18) to front corner portions (40a, 40b) of trailer (16) and are sized for preventing over-articulation. Routing member (24) assists resilient members (22a, 22b) in applying a restoring moment about the pivot axis (34). Namely, the routing member (24) extends from the hitch (18) or tongue (20) adjacent to pivoting axis (34). The routing member (24) includes attachment members (48a, 48b) with resilient members (22a, 22b) extending therethrough.

12 Claims, 2 Drawing Sheets

U.S. PATENT DOCUMENTS

| | | | |
|---|---|---|---|
| 6,386,571 B1 * | 5/2002 | Vollmer et al. | 280/455.1 |
| 6,401,876 B1 | 6/2002 | Boros | |
| 6,474,675 B1 | 11/2002 | Bockman et al. | |
| 6,485,046 B1 * | 11/2002 | Hsueh et al. | 280/455.1 |
| 6,629,701 B1 * | 10/2003 | Colibert | 280/455.1 |
| 6,722,682 B2 * | 4/2004 | Valliere et al. | 280/405.1 |
| 6,854,557 B1 | 2/2005 | Deng et al. | |

* cited by examiner

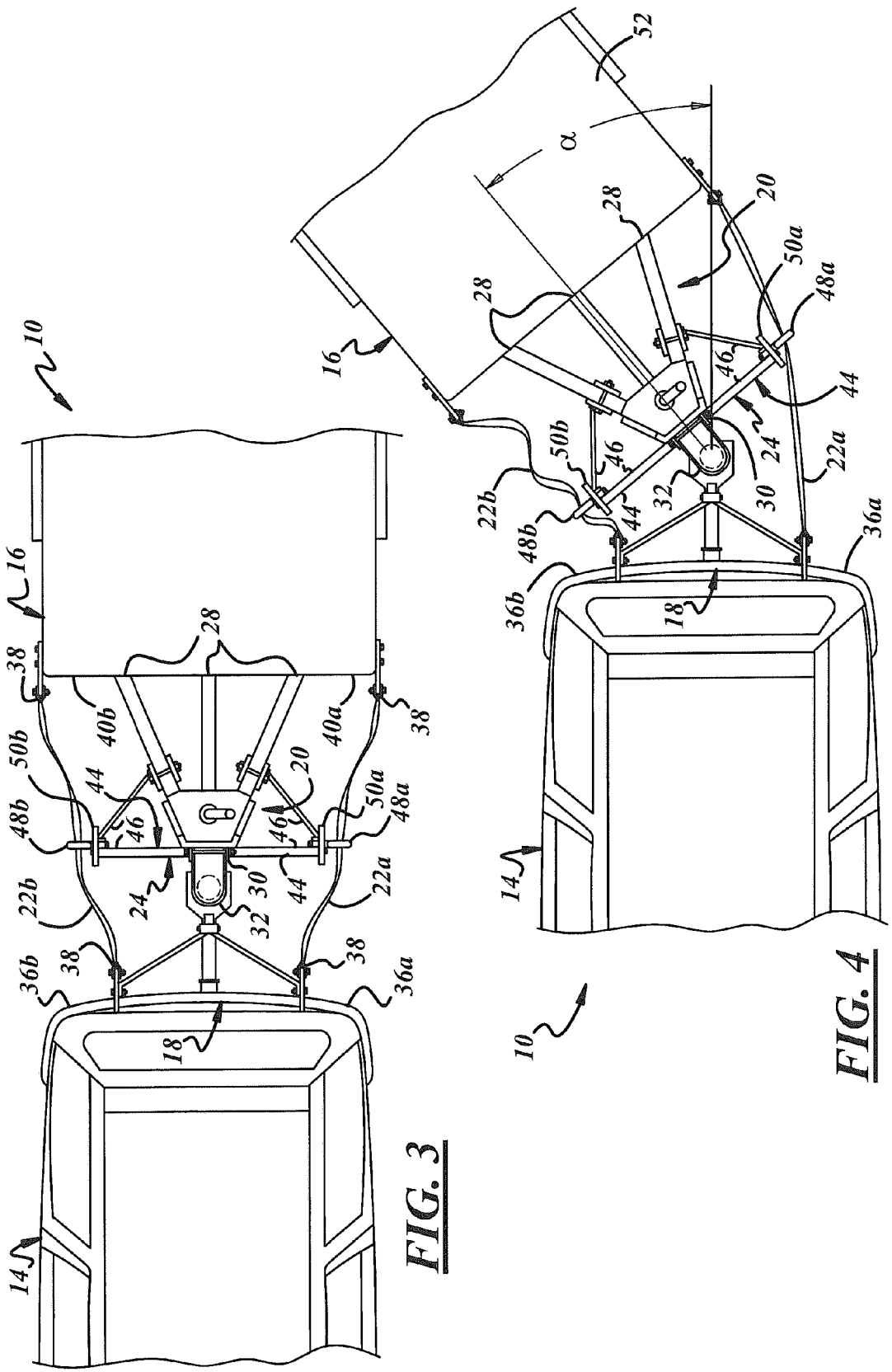

ANTI-JACKKNIFING HITCH ASSEMBLY

TECHNICAL FIELD

The present invention relates generally to articulated vehicles, and more particularly to an anti-jackknifing hitch assembly with a simple and robust construction that enhances control of an articulated vehicle, as compared with conventional anti-jackknifing couplings.

BACKGROUND

Anti-jackknifing couplings have been developed to prevent damage to articulated vehicles. Jackknifing is the accidental folding of an articulated vehicle such that it resembles the acute angle of a folding knife. One example of jackknifing occurs when a tow vehicle skids and a trailer pushes the tow vehicle from behind until the tow vehicle spins around and faces backwards. Typical causes for jackknifing include equipment failure, improper braking, or adverse conditions, such as an icy road surface.

One known anti-jackknifing device includes a pair of stop blocks extending from the trailer, which engage a pair of latch blocks extending from the tow vehicle. These rigid blocks prevent movement of the vehicle beyond a predetermined range of free articulation. However, it will be appreciated that the rigid blocks may fracture when the stop blocks impact the latch blocks under an initial impulse load. Also, the rigid blocks typically do not warn the driver of over-articulation of the vehicle.

Typical anti-sway hitches can include an array of complex linkages with helical springs for damping the swaying movement of improperly loaded trailers. These complex linkages can increase the time required for installation on vehicles.

It is therefore desirable to provide an anti-jackknifing hitch assembly having a simple construction that improves control of an articulated vehicle, provides feedback regarding trailer position, and prevents over-articulation of the vehicle.

SUMMARY OF THE INVENTION

An anti-jackknifing hitch assembly ("assembly") is provided. The assembly includes a hitch, a tongue, a pair of resilient members, and a routing member. The hitch is attached to a tow vehicle. The tongue extends from a trailer and is pivotally attached to the hitch. The tongue pivots about a pivot axis within a predetermined range of articulation defined by the resilient members. In particular, the hitch has a pair of opposing end portions, with the trailer having a pair of opposing front corner portions. The resilient members respectively connect the end portions of the hitch to the front corner portions of the trailer. The resilient members are sized to prevent over-articulation of the tow vehicle and the trailer. The routing member assists the resilient members in applying a restoring moment about the pivot axis. Namely, the routing member extends from one of the hitch and the tongue adjacent to the pivot axis. The routing member includes a pair of attachment members with the resilient members extending therethrough.

One advantage of the invention is that an anti-jackknifing hitch assembly is provided that prevents an articulated vehicle from jackknifing and damaging itself.

Another advantage of the invention is that an anti-jackknifing hitch assembly is provided that has a simple robust construction with lower costs, as compared with conventional anti-jackknifing devices.

Yet another advantage of the invention is that an anti-jackknifing hitch assembly is provided that is sufficiently strong for stabilizing an articulated vehicle and receiving an impulse load typically associated with a jackknifing vehicle.

Still another advantage of the invention is that an anti-jackknifing hitch assembly is provided that notifies a driver about the articulation of the trailer.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 3 is a top plan view of the articulated vehicle shown in FIG. 1, illustrating the anti-jackknifing hitch assembly during normal operation of the vehicle; and FIG. 4 is a top plan view of the articulated vehicle shown in FIG. 1, illustrating the anti-jackknifing hitch assembly under a jackknifing condition.

DETAILED DESCRIPTION OF THE INVENTION

Figure 1:
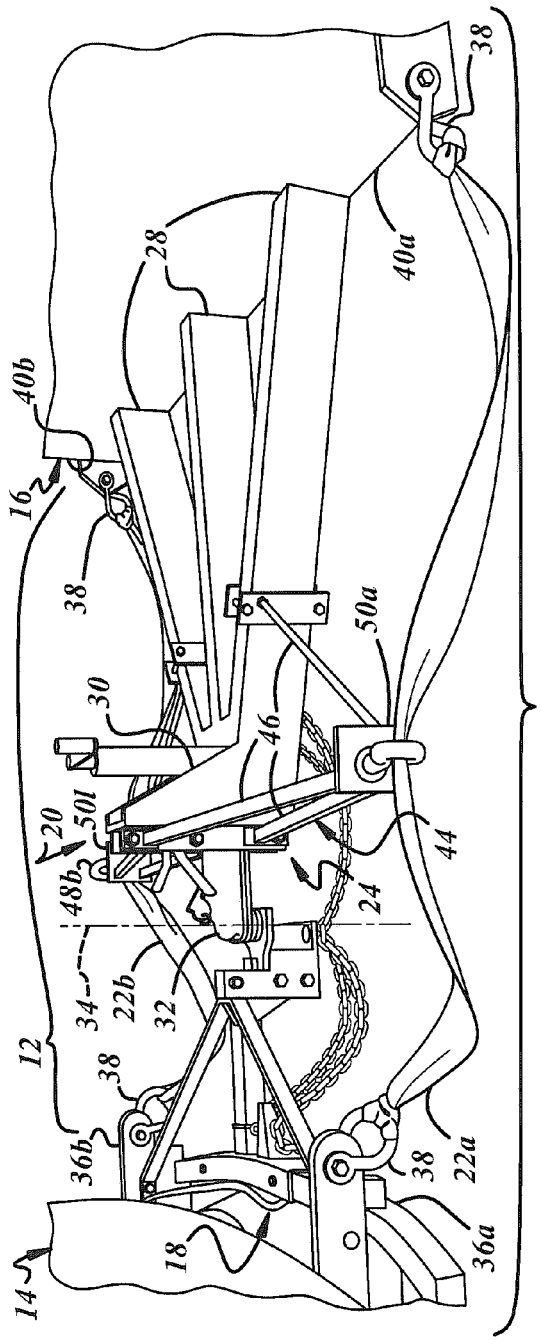
FIG. 1 is a side view of an articulated vehicle having an anti-jackknifing hitch assembly, according to one embodiment of the invention.

In the following figures, the same reference numerals are used to identify the same components in the various views.

Referring to FIG. 1, there is illustrated an articulated vehicle 10 having an anti-jackknifing hitch assembly 12 ("assembly"), according to one embodiment of the invention. As detailed below, the assembly 12 is beneficial for preventing the articulated vehicle 10 from jackknifing, enhancing control of the vehicle 10, and providing feedback as to trailer position. Also, it will be appreciated that the assembly 12 has a simple and robust construction that can be readily integrated within existing vehicles at a substantially low cost, as compared with existing anti-jackknifing couplings.

Figure 2:
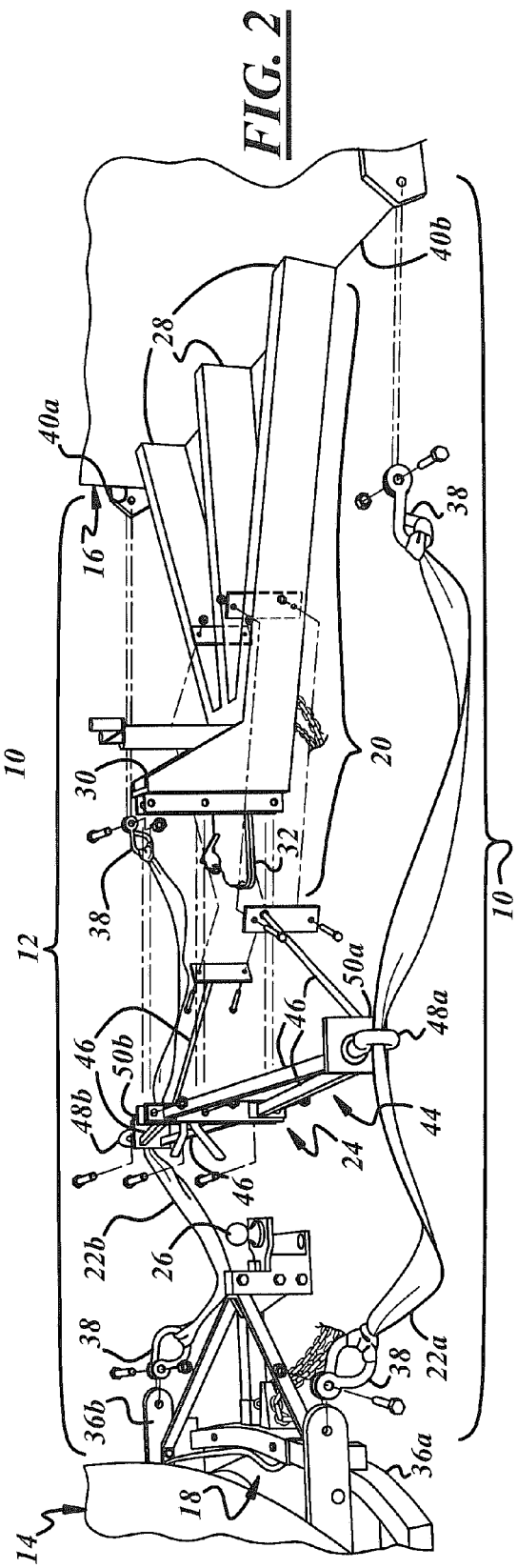
FIG. 2 is a perspective exploded view of the anti-jackknifing hitch assembly shown in FIG. 1.

The articulated vehicle 10 includes a tow vehicle 14, a trailer 16, and the assembly 12 pivotally attaching the trailer 16 to the tow vehicle 14. As best shown in FIG. 2, the assembly 12 includes a hitch 18, a tongue 20, a pair of resilient webbings 22a, 22b and a routing member 24.

The hitch 18 is attached to the tow vehicle 14. In the illustrated embodiment, the hitch 18 is a fixed-tongue hitch with a hitch ball 26 (shown in FIG. 2). However it is contemplated that the hitch 18 can instead be a fixed-undercar hitch, a receiver-style hitch, a custom hitch, a round-tube hitch, or various other suitable hitches.

The tongue 20 extends from the trailer 16 and is attached to the hitch 18. Specifically, the tongue 20 is a series of beams 28 extending from the trailer 16 and converging to a bracket 30 with a coupler socket 32. The coupler socket 32 receives the hitch ball 26 and pivotally attaches to the same. In this way, the tongue 20 and the trailer 16 articulate about a pivot axis 34 (shown in FIG. 1).

With attention to FIGS. 3 and 4, the resilient webbings 22a, 22b connect the trailer 16 and the hitch 18 and are sized for limiting articulation of the vehicle 10 within a predetermined range. Namely, the hitch 18 has a pair of opposing end portions 36a, 36b with ring anchors 38. Likewise, the trailer 16 has a pair of opposing front corner portions 40a, 40b with ring anchors 38. Resilient webbings 22a, 22b attach the end portions 36a, 36b respectively to front corner portions 40a, 40b. As shown in FIG. 4, the outermost webbing in a turn is pulled taut when the vehicle 10 articulates beyond the predetermined range of articulation. In the illustrated embodiment, the webbings 22a, 22b are sized for defining a forty-degree range of articulation. However, it is understood that the webbings 22a, 22b can be sized for defining other suitable ranges of articulation.

The resilient webbings 22a, 22b apply a restoring moment to the vehicle 10 by the routing member 24. In particular, the routing member 24 is a frame 44 attached to the tongue 20 adjacent to the pivot axis 34. However, it is understood that the routing member 24 can instead be attached to the hitch 18. As best shown in FIG. 2, the frame 44 is formed from a series of bars 46 and a pair of loops 48a, 48b which hold the resilient webbings 22a, 22b. In this way, the slackened resilient webbings 22a, 22b slide through the loops 48a, 48b as the vehicle 10 articulates during normal operation (shown in FIG. 3) and applies a restoring moment about the pivot axis 34 when the vehicle articulates beyond the predetermined range of articulation (shown in FIG. 4).

In the illustrated embodiment, the frame 44 of the routing member 24 includes six bars 46, extending from the tongue 20 and converging to a pair of plates 50a, 50b with the respective loops 48a, 48b. Four lower bars 46, which are coplanar with the beams 28 of the tongue 20, extend perpendicularly from the tongue 20 for supporting a significant load transferred from the resilient webbings 22a, 22b. Two bars 46 extend downward from bracket 30 to the respective loops 50a and 50b. The plates 50a, 50b assist in transferring the load to the tongue 20.

The resilient webbings 22a, 22b are sufficiently strong for receiving an impulse load and straightening the articulated vehicle 10. In this way, the vehicle 10 drifts and slows down so as to improve control of the vehicle 10. The resilient webbings 22a, 22b are sufficiently elastic for notifying the driver of the articulation and providing him with time to correct the over-articulation. For instance, in the illustrated embodiment, the resilient webbings 22a, 22b are formed from a nylon material that can receive a load of 30,000 lbs with a spring constant of 4,200 pounds per inch. It is contemplated that the resilient webbings 22a, 22b can be formed from a variety of suitable materials, receiving more or less than 30,000 lbs. and having a spring constant that is more or less than 4,200 lbs. per inch.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An anti-jackknifing hitch assembly, comprising:
a hitch attached to a tow vehicle;
a tongue extending from a trailer and pivotally attached to said hitch;
said tongue pivoting about a pivot axis within a predetermined range of articulation;
a pair of resilient members sized for defining said predetermined range of articulation and preventing said tow vehicle and said trailer from jackknifing;
said hitch having a pair of opposing end portions; said trailer having a pair of opposing front corner portions;
said resilient webbings respectively connecting said opposing end portions of said hitch with said opposing front corner portions of said trailer; and
a routing member assisting said resilient webbings in applying a restoring moment about said pivot axis;
said routing member extending laterally from one of said hitch and said tongue adjacent to said pivot axis;
said routing member formed from a frame having at least one pair of bars and at least one pair of loops with said resilient members extending therethrough.

2. The anti-jackknifing hitch assembly recited in claim 1 wherein said at least one pair of bars of said routing member extends perpendicularly from said tongue.

3. The anti-jackknifing hitch assembly recited in claim 1 wherein said at least one pair of bars of said routing member includes three of said bars converging to each of said loops.

4. The anti-jackknifing hitch assembly recited in claim 1 wherein said resilient webbings are slackened when said tow vehicle and trailer are positioned within said predetermined range of articulation.

5. The anti-jackknifing hitch assembly recited in claim 1 wherein one of said resilient webbings is pulled taut when said tow vehicle and said trailer articulate beyond said range of predetermined articulation.

6. The anti-jackknifing hitch assembly recited in claim 1 wherein said resilient webbings are formed from a nylon material.

7. The anti-jackknifing hitch assembly recited in claim 1 wherein said pair of loops of said routing member are positioned diametrically across said pivot axis.

8. The anti-jackknifing hitch assembly recited in claim 1 wherein said resilient webbings are respectively attached to said opposing end portions of said hitch and said front corner portions of said trailer by a series of ring anchors.

9. An articulated vehicle, comprising:
a tow vehicle having a rear end structure;
a trailer; and
said anti-jackknifing hitch assembly recited in claim 1 with said tongue extending from said trailer and said hitch extending from said tow vehicle;
said tongue including a coupler, a bracket, and a plurality of beams;
said plurality of beams converging toward said bracket;
said bars of said routing member extending perpendicularly from said plurality of beams and said bracket.

10. An anti-jackknifing hitch assembly, comprising:
a hitch attached to a tow vehicle;
a tongue extending from a trailer and pivotally attached to said hitch;
said tongue pivoting about a pivot axis within a predetermined range of articulation;
a pair of resilient webbings sized for defining said predetermined range of articulation and preventing said tow vehicle and said trailer from jackknifing;
said hitch having a pair of opposing end portions; said trailer having a pair of opposing front corner portions;
said resilient webbings respectively connecting said opposing end portions of said hitch with said opposing front corner portions of said trailer; and
a routing member assisting said resilient webbings in applying a restoring moment about said pivot axis;
said routing member extending laterally from said tongue adjacent to said pivot axis;
said routing member having a pair of loops with said resilient members extending therethrough;

said routing member further including a pair of contoured plates adjacent to said loops with said contoured plates distributing a force across a predetermined length of said resilient webbings.

11. An articulated vehicle, comprising:

a tow vehicle having a rear end structure;

a trailer; and said anti-jackknifing hitch assembly recited in claim 10 with said tongue extending from said trailer and said hitch extending from said tow vehicle;

said resilient webbings are slackened when said tow vehicle and trailer are positioned within said predetermined range of articulation;

one of said resilient webbings is taut when said tow vehicle and said trailer are positioned beyond said range of predetermined articulation.

12. The articulated vehicle recited in claim 11 wherein said resilient webbings are respectively attached to said opposing end portions of said hitch and said front corner portions of said trailer by a series of ring anchors.

* * * * *